United States Patent [19]
Daily et al.

[11] Patent Number: 6,088,655
[45] Date of Patent: Jul. 11, 2000

[54] ELECTRICAL RESISTANCE TOMOGRAPHY FROM MEASUREMENTS INSIDE A STEEL CASED BOREHOLE

[75] Inventors: William D. Daily, Livermore; Clifford Schenkel, Walnut Creek; Abelardo L. Ramirez, Pleasanton, all of Calif.

[73] Assignee: The Regents of the University of California, Oakland, Calif.

[21] Appl. No.: 08/943,094

[22] Filed: Sep. 26, 1997

[51] Int. Cl.$^7$ ..................................................... G06F 19/00
[52] U.S. Cl. ................................................................ 702/7
[58] Field of Search ............................... 702/7; 324/351, 324/355, 356, 368, 372

[56] References Cited

U.S. PATENT DOCUMENTS

| | | | |
|---|---|---|---|
| 4,796,186 | 1/1989 | Kaufman | 364/422 |
| 4,820,989 | 4/1989 | Vail, III | 324/368 |
| 4,837,518 | 6/1989 | Gard et al. | 324/368 |
| 4,882,542 | 11/1989 | Vail, III | 324/368 |

OTHER PUBLICATIONS

W. Daily et al., "Cross–Borehole Resistivity Tomography", Geophysics, vol. 56, No. 8 (Aug. 1991), p. 1228–1235.
W. Daily et al., "Electrical Resistivity Tomography of Vadose Water Movement", Water Resources Research, vol. 28, No. 5, p. 1429–1422, May 1, 1992.

*Primary Examiner*—Donald E. McElheny, Jr.
*Attorney, Agent, or Firm*—L. E. Carnahan; Alan H. Thompson

[57] ABSTRACT

Electrical resistance tomography (ERT) produced from measurements taken inside a steel cased borehole. A tomographic inversion of electrical resistance measurements made within a steel casing was then made for the purpose of imaging the electrical resistivity distribution in the formation remotely from the borehole. The ERT method involves combining electrical resistance measurements made inside a steel casing of a borehole to determine the electrical resistivity in the formation adjacent to the borehole; and the inversion of electrical resistance measurements made from a borehole not cased with an electrically conducting casing to determine the electrical resistivity distribution remotely from a borehole. It has been demonstrated that by using these combined techniques, highly accurate current injection and voltage measurements, made at appropriate points within the casing, can be tomographically inverted to yield useful information outside the borehole casing.

16 Claims, 16 Drawing Sheets

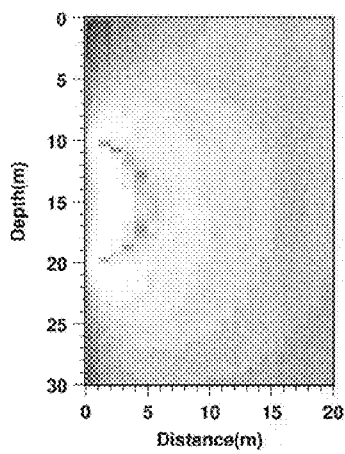 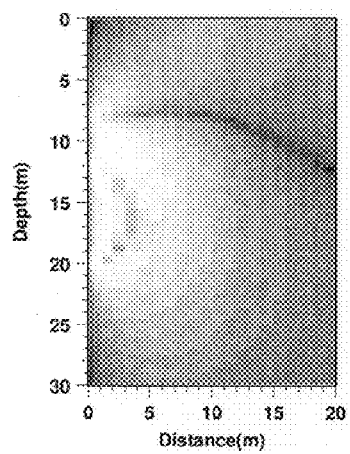 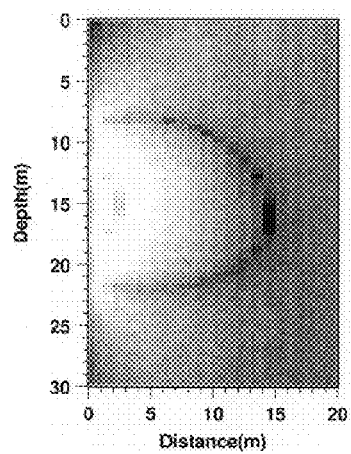
FIG. 2A  FIG. 2B  FIG. 2C
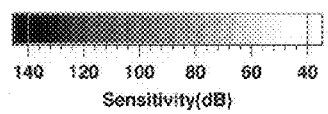
FIG. 2D

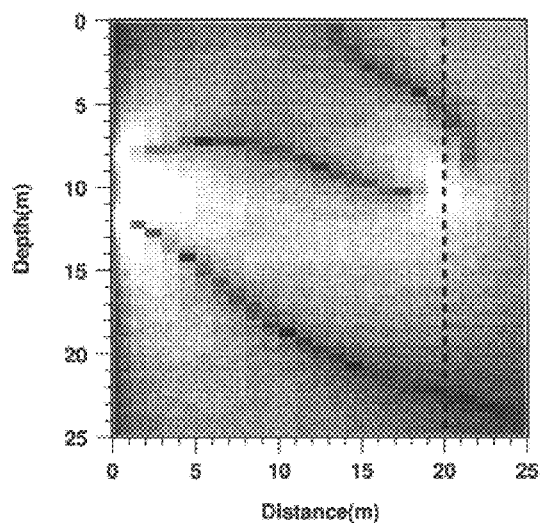 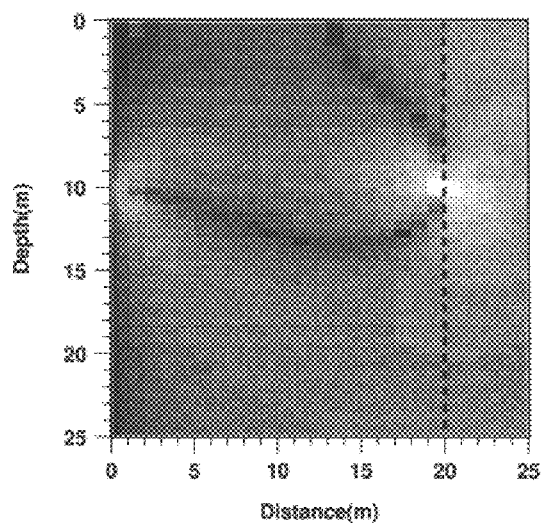
FIG. 4C    FIG. 4D
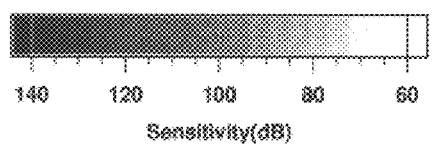
FIG. 4F

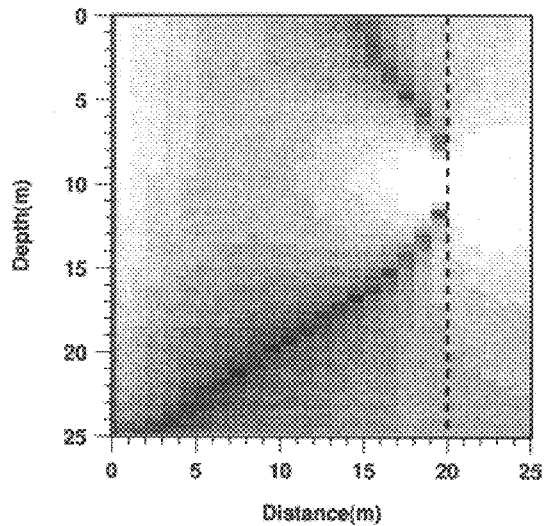 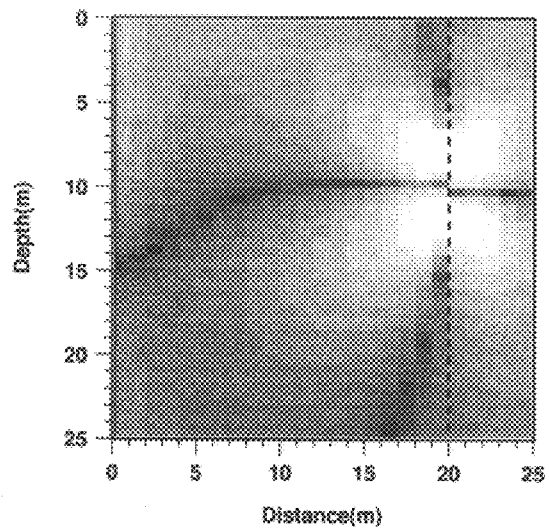
FIG. 5A            FIG. 5B
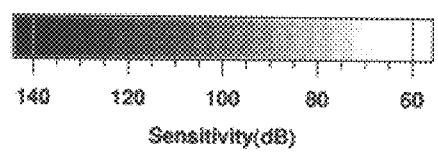
FIG. 5E

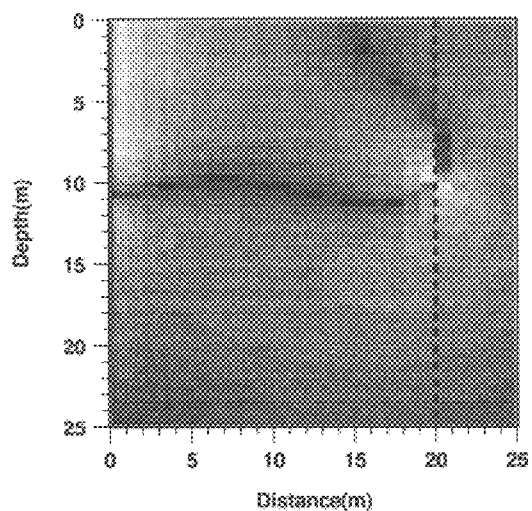
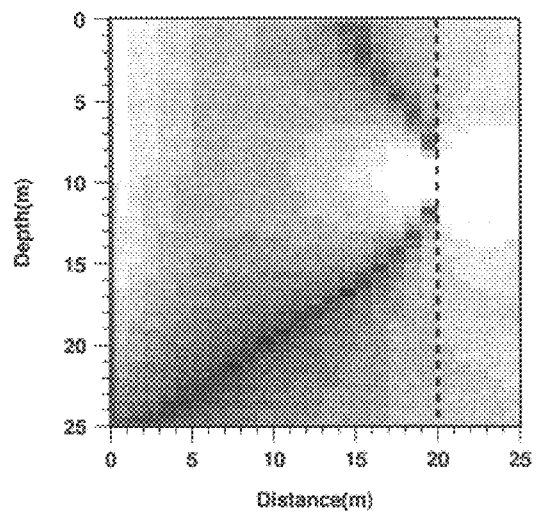
FIG. 5C    FIG. 5D
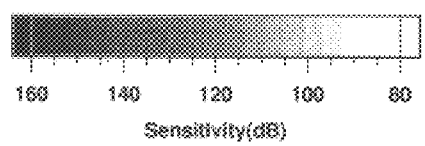
FIG. 5F

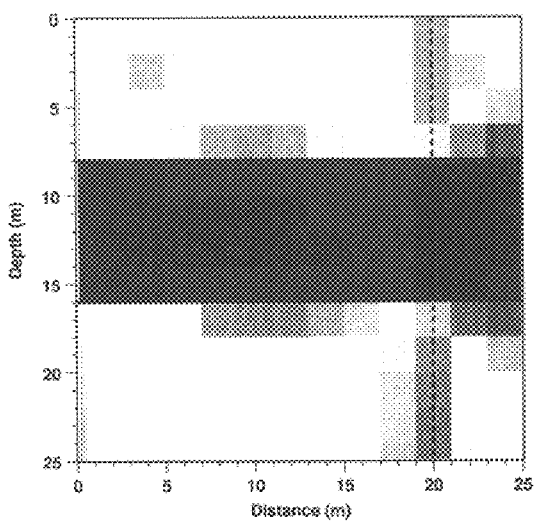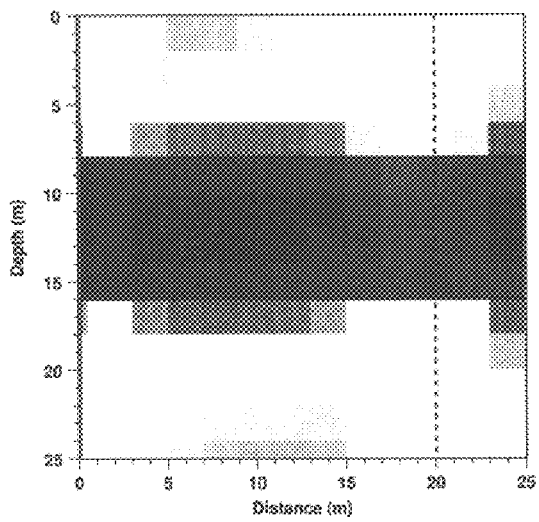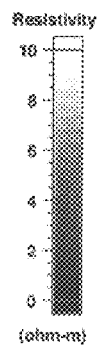
FIG. 8A
FIG. 8B
FIG. 8C

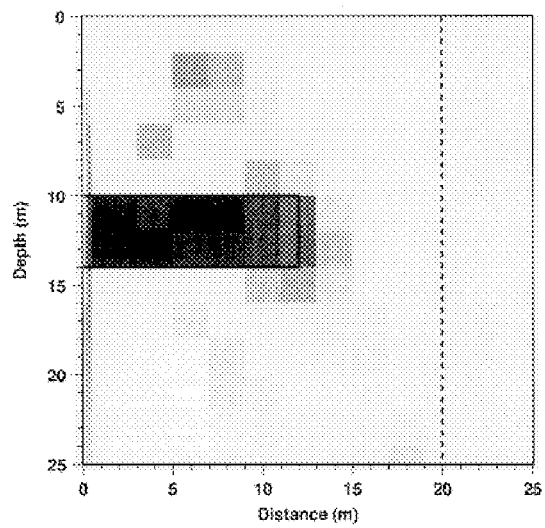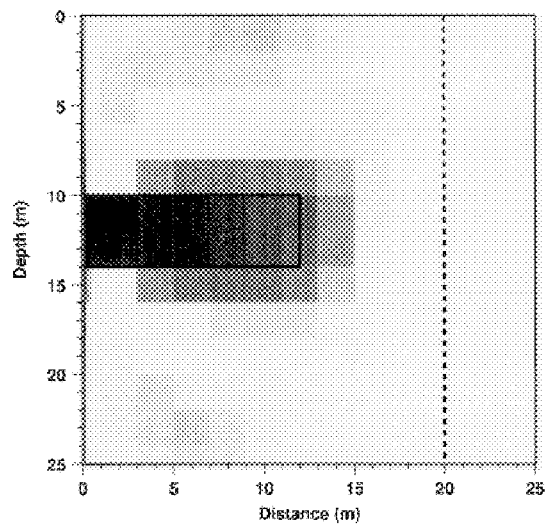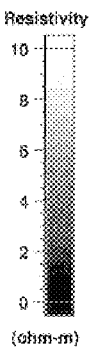
FIG. 10A
FIG. 10B
FIG. 10C

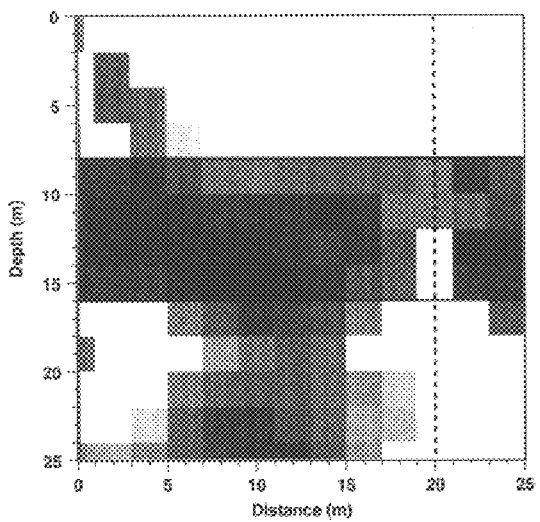
FIG. 12A
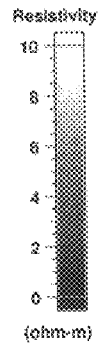
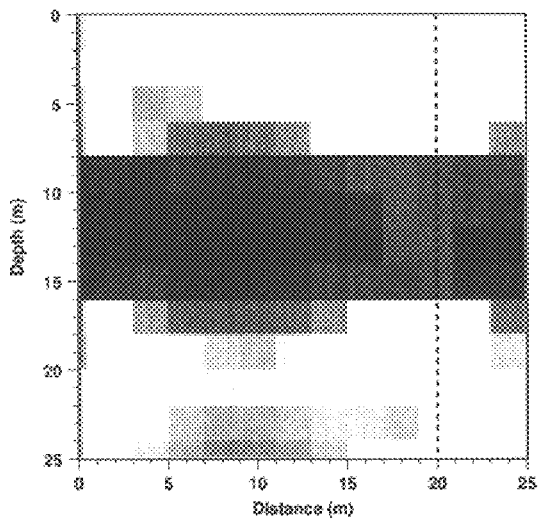
FIG. 12B
FIG. 12C 6,088,655

ELECTRICAL RESISTANCE TOMOGRAPHY FROM MEASUREMENTS INSIDE A STEEL CASED BOREHOLE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to electrical resistance tomography, particularly to imaging the electrical resistivity distribution in a formation remote from a borehole, and more particularly to an electrical resistance tomography method which combines making electrical resistance measurements inside a steel casing in a borehole and electrical resistance measurements made from an uncased borehole or a borehole not cased with an electrically conducting casing, and thereafter tomographic inversion of the electrical resistance measurements.

Electrical resistivity tomography (ERT) is a method for determining the electrical resistivity distribution in a volume from discrete measurements of current and voltage made within the volume or on its surface. A model of the subsurface of interest is produced by obtaining electrical resistivity measurements from various points of the subsurface area of interest and the thus generated data is used in an inverse mathematical calculation to produce the model.

In recent years, there has been a growing interest in measuring formation resistivity through metal cased wells. There are tens of thousands of cased wells where the resistivity logs are missing or obsolete due to changes of the subsurface conditions and cannot be logged by conventional open-hole methods. The ability to obtain resistivity information through cased wells can reaccess existing reservoirs for effective recovery of oil and gas, or geothermal energy, without the cost and time of drilling new wells. This technique can also monitor resistivity changes over time associated with subsurface flow processes such as injection or leakage of contaminants from a waste site, steam or water flooding operations or enhanced oil recovery, or the process of geothermal production.

Various different approaches have been proposed or utilized for obtaining the electrical measurement data. For example, U.S. Pat. Nos. 4,796,186 issued to A. A. Haufman; No. 4,820,989 issued to W. B. Vail, III; No. 4,837,518 issued to M. F. Gard et al.; and No. 4,882,542 issued to W. B. Vail, III involve measuring formation resistivity with direct current (DC) devices that operate within a cased well. W. B. Vail et al. have developed a tool, called Through-Casing Resistivity Tool, that produces excellent results, see Vail et al., "Formation resistivity measurements through metal casings", Transactions, SPWLA 34th Annual Logging Symposium, Jun. 13–16, 1993, Calgary, Canada. This tool uses a multielectrode configuration to determine the casing conductance and the contact resistance. The contact resistance is the resistance offered to current leaving the metal casing and flowing radially into the formation and is proportional to the formation resistivity. Other examples of prior efforts are provided by W. Daily et al., "Cross-borehole resistivity tomography", Geophysics, Vol. 56, No. 8 (August 1991), pgs. 1228–1235; and W. Daily et al., "Electrical Resistivity Tomography of Vadose Water Movement", Water Resources Research, Vol. 28, No. 5, pgs. 1429–1442, May 1992.

The above-referenced patented approaches were directed to the single hole logging problem where the sampled radius is limited to the regions near the well. The use of crosshole measurements can determine the electrical properties between wells. However, presently used DC crosshole methods require open wells or installing electrodes outside nonconductive casings. Metal cased well were not used in the above-referenced patented approaches. However, Schenkel and Morrison, "Electrical resistivity measurement through metal casings", Geophysics, 59, pgs 1072–1082, 1994, indicate that a metal cased well may be also used effectively in crosshole surveys.

The present invention involves the next step and uses the cased well in crosshole measurements and makes electrical resistance measurements inside a steel casing of a borehole and from a borehole not cased with an electrically conducting casing to determine the electrical resistivity distribution between the boreholes.

SUMMARY OF THE INVENTION

It is an object of the present invention to provide tomographic inversion of electrical resistance measurements.

A further object of the invention is to provide electric resistance tomography from measurements inside a steel cased borehole.

A further object of the invention is to provide the tomographic inversion of electrical resistance measurements made within a steel casing for the purpose of imaging the electrical resistivity distribution in the formation remotely from the borehole.

Another object of the invention is to combine existing technologies which involves making resistance measurements inside a steel casing and electrical resistance measurements made from a borehole not cased with an electrically conducting casing, and tomographic inversion of these data.

Other objects and advantages will become apparent from the following description and accompanying drawings. The invention involves the tomographic inversion of electrical resistance measurements made within a steel casing for the purpose of imaging the electrical resistivity distribution in the formation remotely from the borehole. The invention involves making electrical resistance measurements inside a steel casing and form a second, uncased borehole, and then inferring the electrical resistivity in the formation adjacent to the boreholes. The presence of the steel casing acts as a short circuit for electric current which makes it difficult to inject current into the formation. However, it has been demonstrated, using numerical simulations, that highly accurate current injection and voltage measurement, made at appropriate points within the casing, can be tomographically inverted to yield useful information outside the casing.

Various applications for the present invention exist, which include environmental site characterization and process monitoring, aquifer evaluation from water wells, site characterization from boreholes, site characterization and process monitoring in oil reservoirs, imaging of subsurface plumbing in geothermal fields, and monitoring of injection of hazardous wastes in deep wells.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIGS. 2A–2C are sensitivity plots for pole-pole, pole-dipole, and dipole-dipole electrode arrays in a single, uncased well.

FIG. 2D is a sensitivity chart for FIGS. 2A–2C.

FIGS. 4A–4D are sensitivity plots for the pole-pole, pole-dipole, dipole-pole, and dipole-dipole electrode arrays in an uncased crosswell survey.

FIGS. 4E and 4F are sensitivity charts for FIGS. 4A–4B and 4C–4D.

FIGS. 5A–5D are sensitivity plots for the pole-pole, pole-dipole, dipole-pole, and dipole-dipole electrode arrays in a cased crosswell survey.

FIGS. 5E and 5F are sensitivity charts for FIGS. 5A–5B and 5C–5D.

FIGS. 8A and 8B are images of a dipole-dipole crosshole survey for an open well and for a cased well using a 3-layer model.

FIG. 8C is a resistivity chart for FIG. 8A and 8B.

FIGS. 10A and 10B are images of the plume for open and for cased crosshole surveys.

FIG. 10C is a resistivity chart for FIGS. 10A and 10B.

FIGS. 12A and 12B are images of the layer from date with biased Gaussian noise added for 0.3% bias error of the RMS value of the data, and for 0.1% relative error of the data.

FIG. 12C is a resistivity chart for FIGS. 12A and 12B.

DETAILED DESCRIPTION OF THE INVENTION

Figure 1:
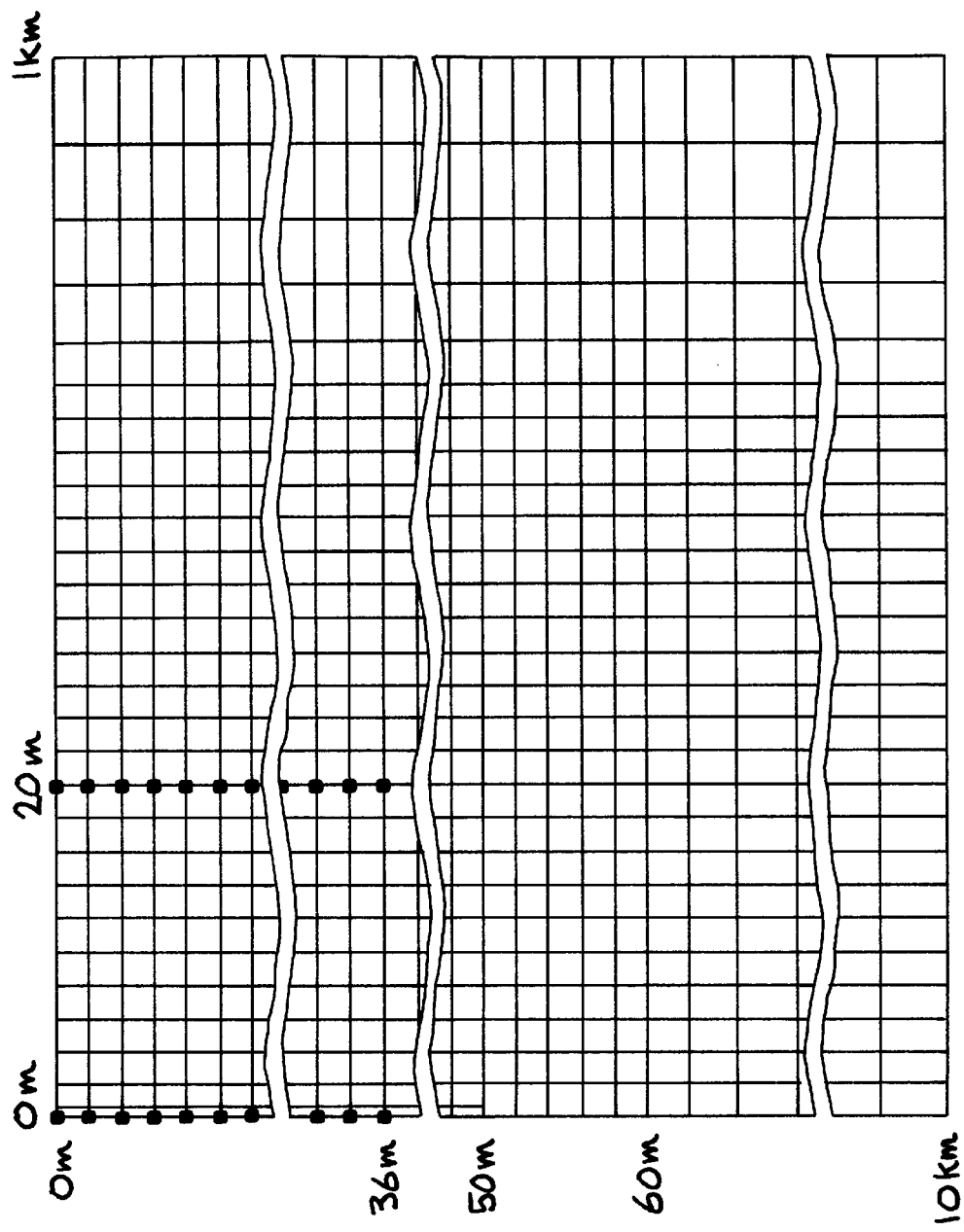
FIG. 1 illustrates a typical configuration of the mesh and electrode placement.

The present invention is directed to electrical resistance tomography from measurements inside a steel cased borehole. The primary technical problem solved by this invention is the presence of a steel pipe (casing) between the measurement system and the formation which is to be imaged. Since the method of imaging involves electric currents injected into the formation, the steel casing tends to shunt the current away from the formation. If the casing was infinitely conducting, all the current injected from inside would flow through the steel of the casing and it would not be possible to image the formation on the outside of the casing. However, the steel casing has a finite (although large) electrical conductivity so that some small current does flow through the casing into the formation. The key feature to making the method of the present invention work is to realize that the effects of the small currents flowing in the formation can be sensed from very accurate measurements made inside the casing. The required accuracy is possible using state-of-the-art electronics and methods and the technique for using such measurements to measure the formation electrical properties adjacent to the borehole, as set forth in above-referenced U.S. Pat. No. 4,796,186; No. 4,820,989; and No. 4,882,542.

The present invention has been experimentally verified and was carried out in two parts. The first part was to perform a sensitivity analysis for various electrode array configurations to determine optimal electrode configurations. The second part was to invert numerically generated data using the optimum electrode arrays for the single hole and crosshole simulations on some simple examples with and without the steel casing present. The description of the experimental verification is set forth hereinafter under three (3) sections; namely, numerical calculations, sensitivity analysis, and inversion of synthetic data, with the sensitivity analysis section including two subsections: single-well measurement sensitivity and gross well measurement sensitivity.

Numerical Calculations

The finite element algorithm used was developed by Dr. D. J. La Brecque, University of Arizona, see A. Ramirez et al., "Monitoring an underground steam injection process using electrical resistance tomography", Water Resources Research, 29, pgs. 73–87, 1993. The code calculates the electric potential response in an axial symmetric medium. By using the same electrode position for the potential measurements and current injection along the borehole axis (r=O), the algorithm can calculate the response for the single well problem. The crosshole configuration is simulated when the receiver electrodes are placed in an adjacent uncased well. For all simulations, the host medium has a resistivity of 10 Ωm. For the crosshole configurations, the uncased receiver borehole is located parallel to and 20 m radially away from the source well. When the metal casing is involved, a 50 m long solid cylinder having an equivalent conductivity of a $10^{-6}$ Ωm annulus with a radius of 0.1 m and thickness of 0.0125 m was used to model the casing.

FIG. 1 illustrates a typical configuration of the mesh and electrode placement used for the sensitivity and forward modeling wherein the uncased receiver borehole is located 20 meters away from the source well. As shown in FIG. 1, each square comprises 2 meters, and electrodes are located at two meter spacings down the boreholes. In tests conducted the mesh consisted of 0.5 meter high elements which were finely discretized (0.05 meter) near the well to 1 m away and then increased up to 1 meter in width to a radial distance of 45 m. For the inversions, the radial meshing of the cells were slightly different. The radial dimensions of the cells were: 0.05 meter from 0 m to 0.25 m from the source well, 0.125 meter from 0.25 m to 1 m, and 1 meter from 1 m to 31 m. Coarse blocks were used far from the casing and these extended the mesh to 1 km radially and 10 km vertically, as shown in FIG. 1.

Sensitivity Analysis

To obtain interpretable results from inversions there must be sufficient data in number and coverage to resolve the unknown parameters (resistivity of the elements). One common way to achieve this is to use a variety of array geometry's for each survey. However, in many situations different configurations produce redundant data which increases the cost of the survey with no benefits to the interpretation. Ideally, one selects a collection of electrode arrays such that each measurement set illuminates the desired region of the medium.

One method to quantify whether there is a significant response in a region is to perform a sensitivity analysis. For example, Spies and Habashy studies the sensitivity for crosswell electromagnetic surveys using the Born approximation to determine the secondary fields caused by a conductivity perturbation, see Spies et al., "Sensitivity Analysis Of Cross-Well Electromagnetics", 62nd Annual International SEG Meeting Expanded Abstracts, 1992, pgs. 502–505. That study showed the strongest response was near the source and receiver, but measurable frequency dependent contributions were also produced in the interwell region.

The "sensitivity" of the measurement is the response of a measurement due to perturbation of the conductivity of a small element in the medium and can be expressed as:

$$\Delta M(r_t, r_r) S = /\Delta \sigma(r)$$

where S is the sensitivity response due to a change of the measurement, $\Delta M$ caused by the conductivity change, $\Delta \sigma$ and $r_t$, $r_r$, and r are the positions of the source, receiver, and the element, respectively.

If small change in the conductivity of the element produces a significant response in the data, then that measurement is greatly effected by the conductivity of the element. By observing the sensitivity responses for various arrays, an optimal configuration for interpreting the signals acquired through casing may be determined.

Several common electrode arrays were examined for the single open hole, single cased borehole cased-uncased and crosswell configurations. Since the casing is highly conductive, the sensitivity of the cased hole simulation does not resemble that of the open-hole simulations. To examine the effects of the casing on the sensitivity, the responses of the casing models were compared to those of the open-hole for each electrode configuration. From these comparisons, the measurement arrays could be evaluated to determine which configuration could produce interpretable results when the casing was present. The sensitivities, calculated for each mesh element, were normalized by the total integrated sensitivity of the entire region and by the ratio of the cell area to the average cell area since unequal cells were used.

For the single hole problem (both open and cased), the source and receiver electrodes are located along the axis of symmetry. The depths of the pole source and pole receiver are 10 m and 20 m, respectively. When the dipoles are used, the source electrodes depths are 8 m and 10 m, while the receiver electrodes are 20 m and 22 m deep. For the crosswell geometry, the sources are placed along the axis of symmetry and the measuring electrodes are located in the hole 20 m away. The pole electrodes are placed in their respective well at 10 m. The source and receiver dipole electrodes are at a depth of 8 m and 12 m.

Single-Well Measurement Sensitivity

FIGS. 2A–2C show selected sensitivity plots of a 25 m×25 m for the single, open-hole using three typical source-receiver arrays: pole-pole (FIG. 2A), pole-dipole (FIG. 2B), and dipole-dipole (FIG. 2C). For all three arrays, the sensitivity was the largest near the source and receiver. FIG. 2D is a sensitivity chart for FIGS. 2A–2C. In the region between the electrodes and near the well, the sensitivities are also large. Away from the well, the rate at which the amplitude decreases depends on the electrode configuration. Source or receiver dipoles exhibit tri-lobal patterns which have the greatest amplitude (greater than −40 dB) in the vicinity of the electrodes and quickly decays to less than −100 dB. Pole source or receiver produces a single lobe sensitivity pattern which encompasses a larger region. Near the pole, the amplitude is approximately −40 dB and decays slowly from the array to about −60 dB. Although the large sensitivity near the well may not be ideal for imaging regions away from the well, the near-well region sensitivity can be greatly reduced by incorporating borehole resistivity logs to constrain this region during the imaging process. Other sensitivity plots (not shown) indicated that the longer array separation and electrode spacings increased the radius of sensitivity in the medium for the single uncased well.

Figure 3A:
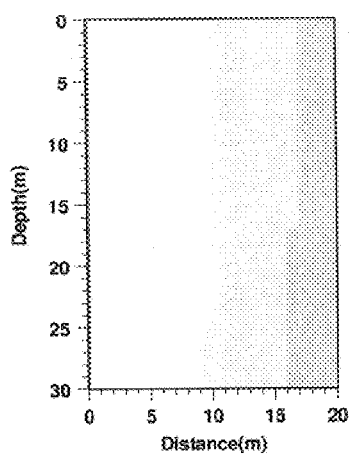
FIGS. 3A–3C are sensitivity plots for pole-pole-pole-dipole, and dipole-dipole electrode arrays in a single, cased well.
Figure 3B:
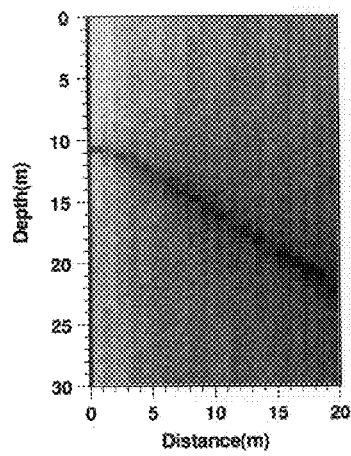
Figure 3C:
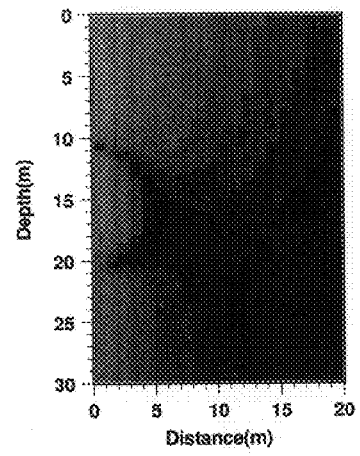
Figure 3D:
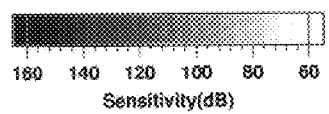
FIG. 3D is a sensitivity chart for FIGS. 3A–3C.

FIGS. 3A–3C show sensitivities from the pole-pole, (FIG. 3A), pole-dipole (FIG. 3B), and dipole-dipole (FIG. 3C) configurations for the single cased well. FIG. 3D is a sensitivity chart for FIGS. 3A–3C. In general, the casing tends to vertically elongate and reduce the sensitivity response. The casing sensitivity responses were reduced approximately 10–100 times when compared to the open-hole results. For the pole-pole array (FIG. 3A), the sensitivity plot shows broad elongated zones parallel to the borehole axis; this resembles the pattern of a line source. The vertical response parallel to the casing indicates that there is virtually no vertical resolution in the sensitivity and there is poor sensitivity in the radial direction since the radial fall-off is small (approximately logarithmic). It was found that the pole-pole sensitivity is independent of the source or receiver positions, therefore there is essentially no information gained by moving the source or receiver. The pole-dipole sensitivity plot (FIG. 3B) shows two vertically elongated regions (above and below the dipole) of opposite polarity. Although the amplitude is much smaller than the pole-pole array, there is a significant resolution both radially and vertically in the region near the dipole. The sensitivity for this configuration is dependent on the both receiver dipole position from the source and the dipole length. (larger dipole separation and source-receiver spacing increase the sensitivity into the medium). The sensitivity pattern for the dipole-dipole (FIG. 3C) is more localized to the region between the electrodes, but the sensitivity response is greatly reduced. The pattern is similar to dipole-dipole response although elongated and smaller the open hole. The region between the source-receiver dipoles is of opposite polarity than the upper and lower regions. Altering the dipole spacing or the source-receiver separation gave the greatest sensitivity response.

Crosswell Measurement Sensitivity

Figure 4A:
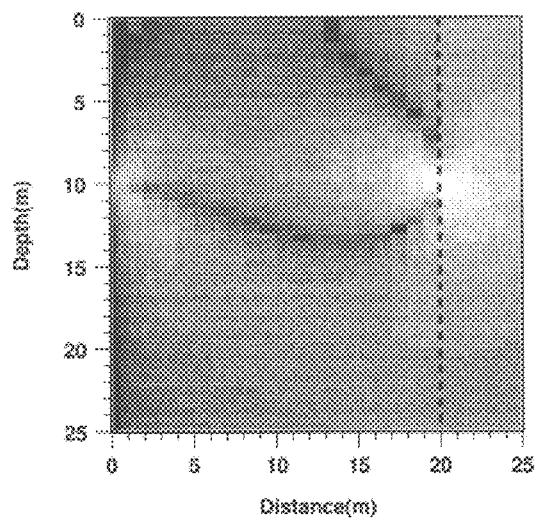
Figure 4B:
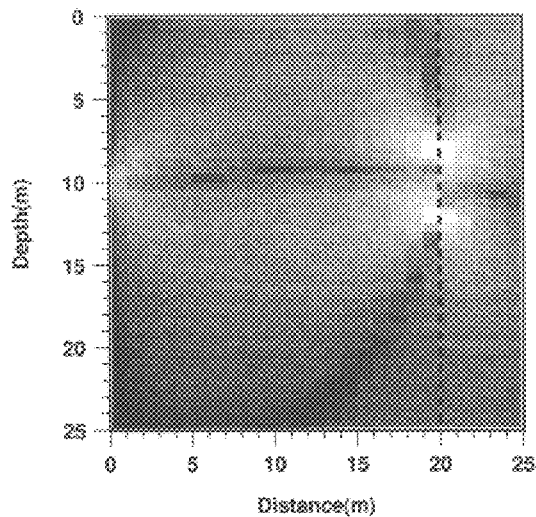
Figure 4E:
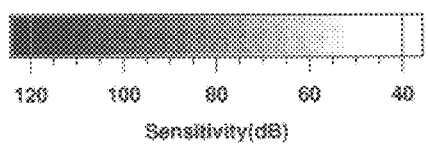

The sensitivities for the cross-well case using four arrays are shown in FIGS. 4A–4D for the open-hole environment. FIGS. 4E and 4F are sensitivity charts for FIGS. 4A–4B and FIGS. 4C–4D. Similar to the single well simulations, the sensitivity was the greatest near the source and receiver electrodes. The pole-pole plot of FIG. 4A shows small sensitivity between the two wells and the pattern extended significantly beyond the interwell region. By incorporating a source or receiver dipole, the response became more focused in the interwell region, but sizable sensitivities still existed beyond the receiver well. However, the dipole-dipole array (FIG. 4D) produced significant sensitivity (although reduced) in the interwell region with very little contribution beyond the outer well. This configuration resulted in an alternating polarity, three-hole pattern near the source well and a four-lobe pattern in the open hole with the largest sensitivities near both dipoles. In general, the pole electrodes produced an (spatially) extensive sensitivity responses, whereas, the dipoles tended to produce smaller but highly localized responses. The sensitivity of various regions can be altered by changing the dipole spacing or source-receiver positions.

With the cased well, the sensitivity responses for all electrode configurations were similar to the open-hole models except that the casing produced a diffused pattern throughout the region, especially near the casing (see FIGS. 5A–5D). The largest sensitivities occurred near the receiver array. FIGS. 5E and 5F are sensitivity charts for FIGS. 5A–5B and FIGS. 5C–5D. For a pole source in the casing, the sensitivity response was independent of the source location in the conductive cylinder. Thus, a pole source (FIGS. 5A and 5B) would limit the number of available arrays for data collection. For dipole sources (FIGS. 5C and 5D), the sensitivity near the casing was similar to the single hole sensitivities. Away from the casing, the response was more dependent on the receiver array. With the dipole source (FIGS. 5C and 5D), the sensitivity pattern near the well could be altered by changing the dipole length or location. When the receiver is a pole electrode, (FIGS. 5A and 5C), the sensitivities in the region beyond the outer well were extremely large and opposite in polarity than that in the interwell region. With a dipole receiver (FIGS. 5B and 5D), the array produced a four-lobe pattern with the largest response near the receiver. When the dipole receiver is used with the pole source (FIG. 5B) the response near the receiver was extremely large and there was a significant response beyond the outer receiver well. Although the magnitude of the sensitivity is small, the dipole-dipole configuration (FIG. 5D) greatly reduced the outer well sensitivity, as well as, increased the ability to alter the pattern by changing either source or measuring dipole.

From this analysis, the dipole-dipole configuration was judged s the most effective electrode array for imaging in cased wells. This agrees with the results of Sasaki in uncased wells. See Y. Sasaki, "Model Studies Of Resistivity Tomography Using Boreholes", International Symposium On Borehole Geophysics: Petroleum, Hydrogeology, Mining, and Engineering Applications, SEG, Tucson, Ariz. 1990. Sasaki compared crosshole images of synthetic data using dipole-dipole and pole-pole configurations and showed the dipole-dipole array was superior in reconstructing complex structures. With the pole source in the casing, the instant analysis showed that there was little vertical resolution and the response was independent of the source location. Additionally, there was significant sensitivity response beyond the outer well. By using a dipole source, the response was more focused within the interwell region and can be changed by varying the dipole length and location. For the receiver configuration, a dipole appeared better than a pole electrode. With the pole receiver, the sensitivity response for a given source location is limited to the location of the pole receiver. Whereas, a dipole receiver can illuminate various interwell regions just by altering the length of the dipole. With the dipole-dipole setup, the sensitivity contributions from the region beyond the outer receiver well was less significant when compared with those of the other electrode configurations.

There is a practical issue of making dipole measurements, especially if the acquisition system has a limited dynamic range. Numerically derived dipole responses from pole measurements tend to be "noisy". Taking pole measurements require that the acquisition system has a dynamic range large enough to measure the large voltages, as well as the small changes in the signals. If the dynamic range is limited, the small voltages (which are of interest) may be lost or truncated. Making dipole measurements require less dynamic range since the voltages measured are smaller and one can usually set the sensitivity range of the instrument near the anticipated signal voltages.

Inversion Of Synthetic Data

The next task in the experimental verification was to resolve the electrical resistivity of the medium from a given data set. Several schemes were tied to find the set of electrode configurations, "schedule" that would produce interpretable results. It was found, through trial and error, that combining crosshole and single-hole measurements would provide sufficient coverage to resolve the resistivity of the medium. An interative nonlinear least squares approach, of LaBrecque was used (see Ramirez et al., referenced above), to reconstruct the resistivities from a synthetic data set of a given model. The algorithm minimizes the objective function:

$$O = X^2 + \Psi$$

where $X^2$ is the chi-squared statistic, and $\Psi$ is a stabilizing function which is used as a constraint. This function, used in the inversion process, stabilizes the solution by minimizing the model roughness and is based on the numerical approximation to the 2-D Laplacian operator (Sasaki, referenced above). The process iterates until the change in the objective function falls below a given tolerance level.

For the first part of this experimentation, synthetic data configuration sets were produced using a 3-layer model and the dipole-dipole configuration. The initial guess, which is required for this algorithm, was either a homogeneous half-space or 3-layers. For all the reconstructions, there were less than 4 percent variation between the objective misfits using either initial guess. However, the use of the three-layer model did reduce the number of iterations for convergence. Thus, only the inversions using the 3-layer initial guess are presented in the following FIGS. 6A–13C. The iterations terminated when the change in the objective function was less than 0.5 percent.

Figure 6A:
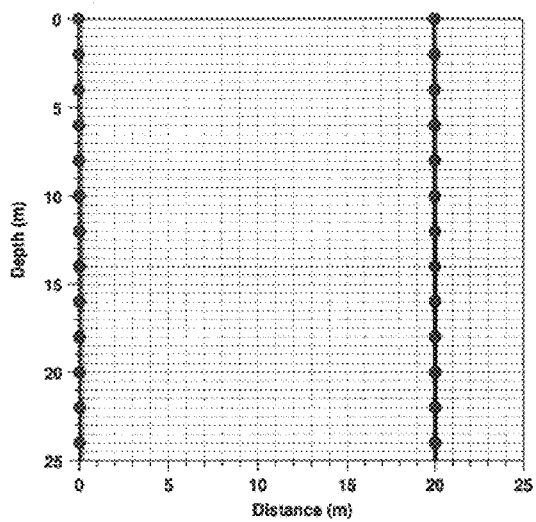
FIGS. 6A and 6B illustrate a mesh and electrode configuration used for the inversion technique, and a 3-layer model used for the inversion analysis.
Figure 6B:
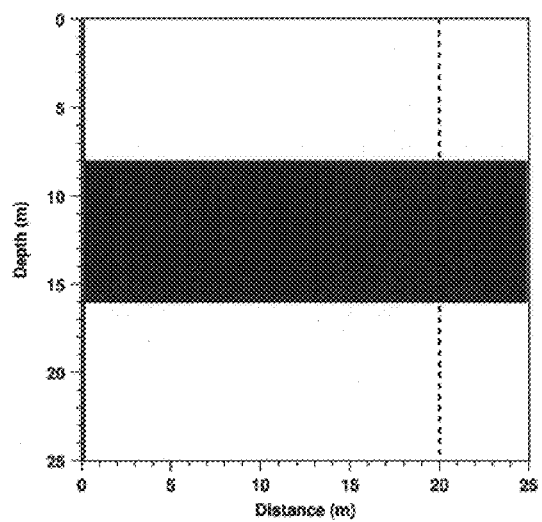
Figure 6C:
FIG. 6C is a resistivity chart for FIG. 6B.

FIG. 6A shows the mesh-electrode configuration used for the inversion and the 25 m 25 m interwell section of a 3-layer model shown in FIG. 6A. FIG. 6C is a resistivity chart. The model consisted of a 1 $\Omega$m target layer, located at depth of 8–16 m, sandwiched between the 10 $\Omega$m surface layer and basal half-space. There were 252 unknown resistivity blocks each consisting of 4 mesh elements; electrodes were placed every 2 meters from the surface down to 36 meters in the two boreholes. The dipole-dipole array scheme, having variable length source and receiver dipoles, consisted of 289 data values for the single well inversion, while 742 measurements were used for crosshole reconstruction. For the initial guess, we assumed that the resistivity of the upper layer and basal half-space was well known (10 $\Omega$m) while the target layer was less known (3 $\Omega$m) than the actual value and placed at the correct depth. This situation simulates what commonly occurs when the initial guess is taken from the resistivity logs. The placement of the layer can be defined accurately, while the resistivity of the targets are less well known.

Figure 7A:
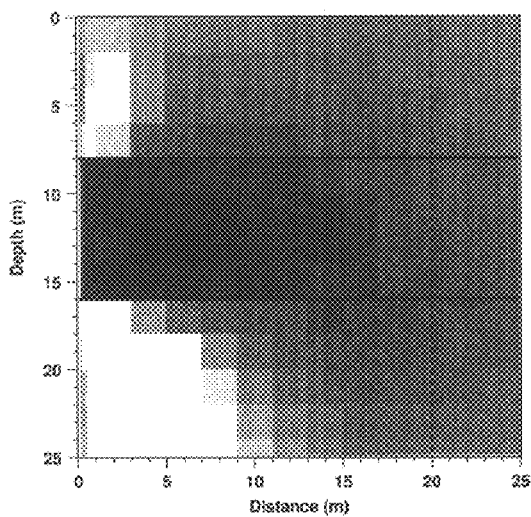
FIGS. 7A and 7B are images of a pole-dipole single hole survey for an open well and for a cased well using a 3-layer model.
Figure 7B:
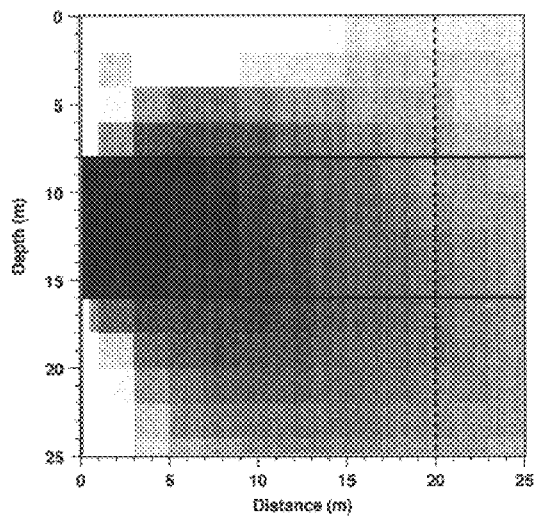
Figure 7C:
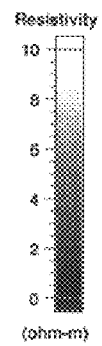
FIG. 7C is a resistivity chart for FIGS. 7A and 7B.

FIGS. 7A and 7B show the images of the open (FIG. 7A) and cased (FIG. 7B) single-hole inversions. FIG. 7C is a resistivity chart. In the open hole image, the bed boundary is clearly defined near the well. But away from the well, the scattering of the conductive layer makes the bed boundaries indistinguishable. The layer seems to fan out and diffuse into the surrounding medium. Without the casing, the scattering of the conductive layer into the surrounding medium is more uniform and covers a larger region then with the casing present. The reconstruction of the cased-well data shows a reduction of the radius of investigation and the degradation of the image. This should be expected since the sensitivity analysis showed a reduction of sensitivity with the casing present. The layer is defined near the well, but is truncated at about 8–10 m with less scattering of the conductive layer into the surround medium.

Incorporating the cross-well data greatly enhanced the reconstruction of the layer, see FIGS. 8A–8C. The open hole inversion produced an accurate image of the layer. There is little scattering and the layer location and resistivity is very close to the actual model. The reconstruction using the crosshole data with the casing present was also excellent. Since the sensitivity and radius of detection are reduced, it is not surprising that this image has slightly more scattering. In the interwell region, the resistivity of the layer varies more than the open hole counterpart. However, the resistivity of the elements is comparable to the actual model and the layer boundaries are well defined.

Figure 9A:
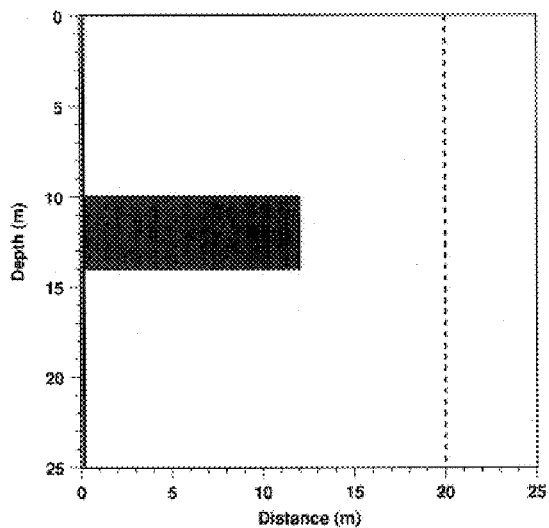
FIGS. 9A and 9B illustrate models used for a plume, and for an annular block.
Figure 9B:
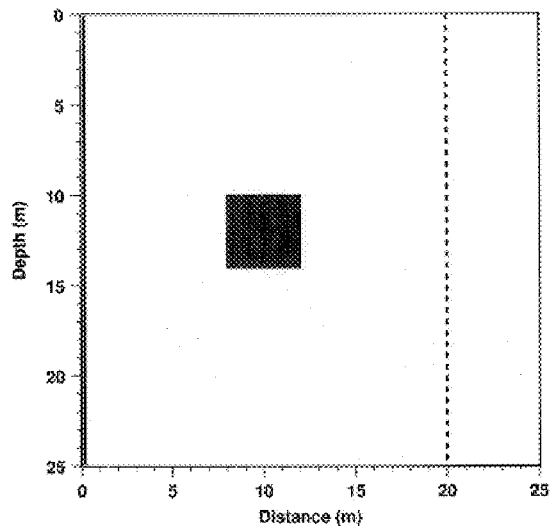
Figure 9C:
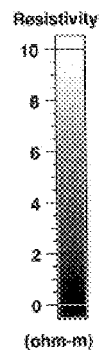
FIG. 9C is a resistivity chart for FIGS. 9A and 9B.

Since imaging the layer appeared possible from data acquired within casing, the ability to image specific objects in the medium was examined next. Two simulations are investigated, see FIGS. 9A–9C. The first (FIG. 9A) is a conductive 1 Ωm plume (disk) centered about the casing and the second (FIG. 9B) is an annular block placed in the medium between the wells. FIG. 9C is a resistivity chart. The plume is 4 m thick and radiates out to 12 m with its top located at a depth of 10 m. The dimensions of the 1 Ωm block are 4 m in thickness and 6 m in width with the center placed at a depth of 11 m and a radial distance of 9 m. The initial guess was the same 3-layer model used previously with the 3 Ωm center layer.

Figure 11A:
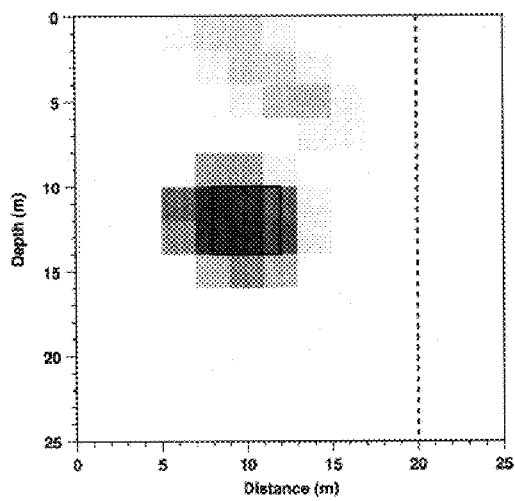
FIGS. 11A and 11B are images of the block for open and for cased crosshole surveys.
Figure 11B:
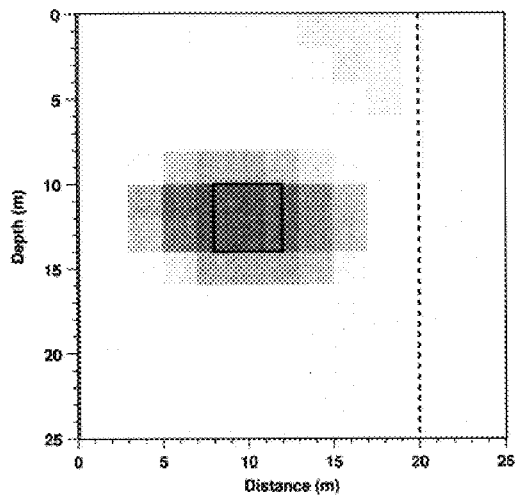
Figure 11C:
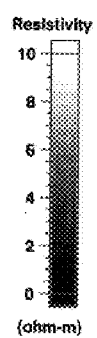
FIG. 11C is a resistivity chart for FIGS. 11A and 11B.
Figure 13A:
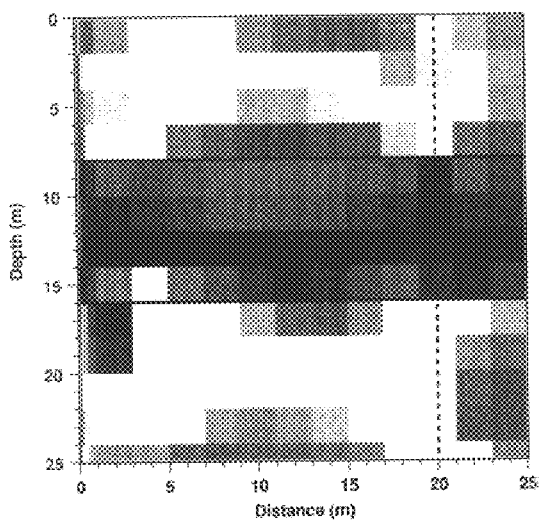
FIGS. 13A and 13B are images of the layer from data with relative Gaussian noise added for 5% relative error of the data, and for 3% relative error of the data.
Figure 13B:
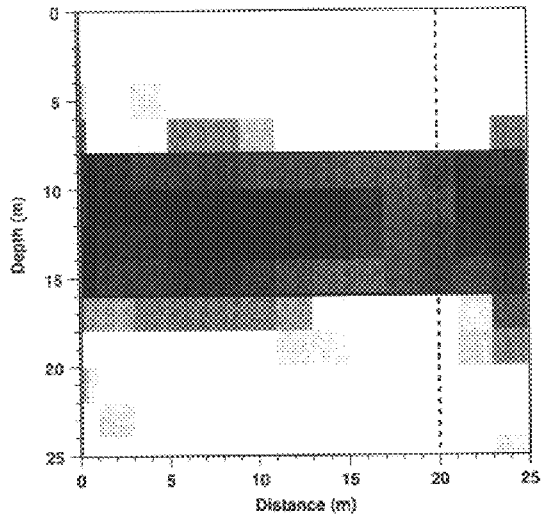
Figure 13C:
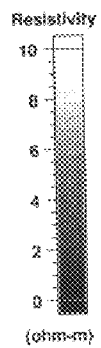
FIG. 13C is a resistivity chart for FIGS. 13A and 13B.

FIGS. 10A–10C show the reconstruction of the plume for the open and cased hole problem, FIG. 1C being a resistivity chart. For the open hole (FIG. 10A), the plume is clearly defined near the well, but it appears scattered and diffuse away from the well. The image of the plume is distinguishable to about 9–11 m with resistivity values of 2 Ωm or less. With the casing present (FIG. 10B), there is more vertical scattering of the image. However, the plume is well defined to about 7–9 m away from the casing with resistivities of 2 Ωm or less. The images of the isolated annular block for the open and cased borehole are shown in FIGS. 11A and 11B. FIG. 11C is a resistivity chart for FIGS. 11A–11B. For the open well (FIGS. 11A), the image of the block is in the correct location but is scattered and the resistivity is higher (≈Ωm) than the model (1 Ωm). When the casing is present (FIG. 11B), the image of the block is distinguishable but more scattered than the image of the open hole and the resistivity values are higher (≈5 Ωm). This result agrees with the sensitivity analysis showing that with the casing present the response of the elements away from the wells are reduced. Some of the lateral scattering of the images involving isolated targets are caused by the large size of the elements. Since the edges of the targets did not coincide with the boundaries of the mesh elements, the lateral resolution is poor. If smaller mesh elements were used, the target would be reconstructed more accurately.

Gaussian noise was added to the data to test the stability of the inversion. Two types of noise were investigated on the synthetic data of the layer model. First, a bias noise was added to the data which was based on a percentage of the rms (root mean square) value of the data. This kind of bias noise may represent the signal floor of the instrumentation. Signals of the same amplitude or smaller than the bias noise level will e contaminated by the instrumentation noise. FIGS. 12A–12B show the images of 0.3% (FIG. 12A) and 0.1% (FIG. 12B) bias noise levels. FIG. 12C is a resitivity chart. Even with bias noise levels of less than 0.3% of the rms value of the data, the inversion produced very poor images of the medium. When the bias error approaches 0.1% rms (FIG. 12B), the reconstruction of the layer was successful. These results showed that the inversion was very sensitive to this noise type where the bias contaminated the signals of the short-length dipoles. Next, a relative percentage of Gaussian noise was added to the data set which was based on the amplitude of individual measurements. The reconstruction was more successful with the presence of this kind of noise. Relative noise levels at about 10% resulted in the divergence of the solution. When the noise levels approached 5%, the solutions converged, but the images were poor. At 3% or less relative error, the reconstruction of the layer can be seen, but, the resistivity values are incorrect, see FIGS. 13A–13C. The 10 Ωm host is imaged at about twice its true value and the layer resistivity ranged from 0.5 Ωm to 4 Ωm.

The above-described sensitivity analysis performed on the several electrode configurations for single and crosshole surveys showed that the casing caused a reduction of the sensitivity in the radial direction and extension of the sensitivity vertically. For the single hole case, there was no sensitivity to electrode variations of the pole-pole array while the sensitivity was limited to the pole-dipole array. The dipole-dipole electrode configuration showed the best response of the sensitivity to changes of the dipole length and location. The crosshole configuration extended the region of sensitivity where the greatest response was in the vicinity of the receiver in the open well. The sensitivity was independent of the pole source in the cased well, whereas the response could be altered by using dipole sources with different separation. While the other arrays (pole-pole, pole-dipole, etc.) produced significant sensitivity response beyond the receiver well, while the dipole-dipole array limited the sensitivity to the interwell region.

As the result of the experimental efforts described above, reconstruction of the medium are possible when measuring through the casing. However, the presence of the casing reduces the radius of detection and degrades the image. For the single hole surveys, the radius of detection is about 3–10 m from the well and the image of the layer was either truncated or scattered. Incorporating the crosshole information successfully reconstructed the conductive layer even with the casing present. The results of the inversion showed that a plume-like target could be imaged from crosshole data with casing present. The inversions were less effective on imaging an isolated target, but they were still able to produce an image (although scattered) of the body).

The inversion was robust when relative noise was incorporated into the data and was able to produce an image with up to 3% relative error. Unfortunately, the inversion was not stable to bias noise and could not reconstruct the layer. The numerical results indicated that the signals will be in the order of microvolts per meter per unit ampere which is difficult or impossible to measure with presently available instrumentation. It is very important to minimize the contamination of bias noise since the inversions results indicated that a noise bias of less than 0.3% of the rms value of the data will make the reconstruction of the medium nearly impossible. It may be necessary to redesign the electrode configurations to minimize the short dipole measurements or devise a different inversion scheme such that the signals are 5–10 times greater than the noise floor of the acquisition system.

In the above-described analysis it was directed only to conductive targets and assumed that the casting conductance was uniform and known. In reality, there are many factors that will vary the casing conductance, such as the composition of the metal, corrosion, environmental, and the presence of the collars, which may be of a different composition than the casing. Fortunately, the casing conductance may be obtained by performing a survey on the inner wall of the casing similar to that described in above-referenced U.S. Pat. No. 4,837,518. In a more resistive environment, the signals may be an order of magnitude smaller. Thus, resistive targets and medium must be analyzed to determine if they can be reconstructed with the electrode arrays described above.

Figure 14:
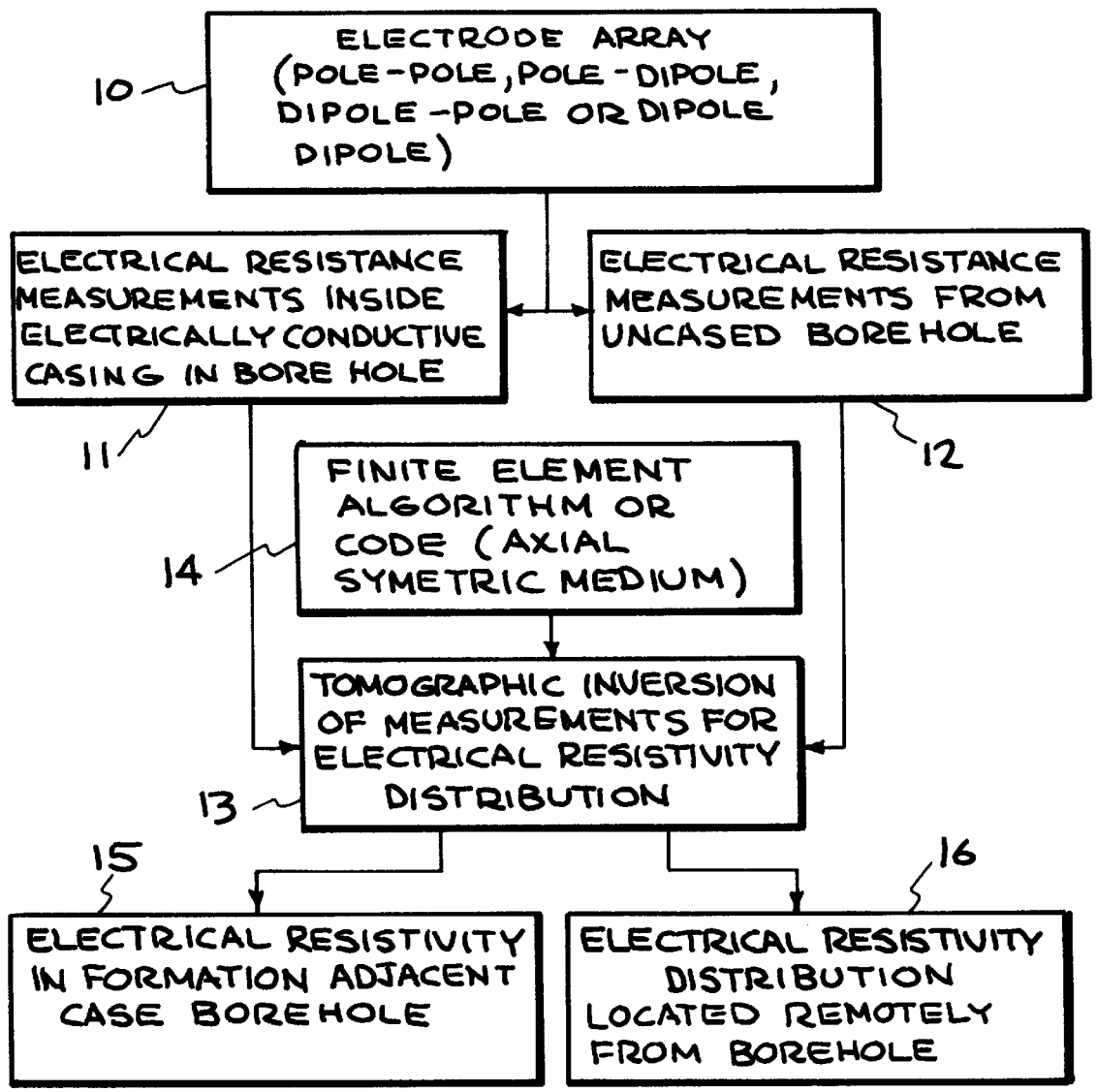
FIG. 14 is a flow chart showing the operational sequence for ERT from measurement inside a steel cased borehole in accordance with the present invention.

It has thus been shown that the present invention provides for electrical resistance tomography from measurement inside a steel cased borehole as illustrated by the flow chart of FIG. 14, the method of the invention is basically carried out by the following sequence of operations: as indicated at box 10, select the electrode array to be used from the group of pole-pole, pole-dipole, dipole-pole, or dipole-dipole. Using the selected electrode array electrode, and as indicated at box 11 electrical resistance measurements inside an electrically conductive casing in a borehole are obtained; and, as indicated at box 12, electrical resistance measurements from an uncased borehole are obtained. As indicated at box 13, tomographic inversion of the electrical resistance measures made in boxes 11 and 12 above is carried out to determine the electrical resistivity distribution between the case borehole (box 11) and the uncased borehole (box 12). The tomographic inversion (box 13) of the electrical resistance measurements is carried out using either a finite element algorithm or a code which calculates the electric potential response in an axial symmetric medium, as indicated at box 14. Additionally, from the tomographic inversion (box 13) the electrical resistivity in a formation adjacent to the cased borehole can be inferred, as indicated at box 15, and the electrical resistivity distribution located remotely from a borehole can be inferred, as indicated at box 16. The electrode array of box 10 may be located in both the cased and the non-cased boreholes at a depth of up to about 50 m. Also, the electrode array of box 10 may include placing one or more electrodes adjacent an interior surface of the conductive casing or by locating the electrodes at spaced intervals along a length of the conductive casing. Also, the electrical resistance measurements of boxes 11 and 12 may be carried out using the same electrode position for potential measurements and current injection along a borehole axis. The primary aspect of this invention is the tomographic inversion of electrical resistance measurements made within a steel casing for the purpose of imaging the electrical resistivity distribution in the formation remotely from the borehole. The invention combines two known techniques, and it has been experimentally demonstrated that highly accurate current injection and voltage measurements, made at appropriate points within a steel casing, can be tomographically inverted to yield useful information outside the casing, even though the steel casing acts as a short circuit for electric current.

While particular electrode arrays, parameters, etc. have been set forth to exemplify and describe the principles of the invention, such are not intended to be limiting. Modifications and changes may become apparent to those skilled in the art, and it is intended that the invention be limited only by the scope of the appended claims.

What is claimed is:

1. An electrical resistance tomography method, including:
    obtaining electrical resistance measurements inside an electrically conductive casing in a borehole;
    obtaining electrical resistance measurements from an uncased borehole, and
    tomographic inversion of the electrical resistance measurements made to determine the electrical resistivity distribution between the cased and uncased boreholes.

2. The method of claim 1, additionally including inferring from the inversion the electrical resistivity in a formation adjacent to the cased borehole, and inferring from the inversion the electrical resistivity distribution located remotely from a borehole.

3. The method of claim 1, wherein the electrical resistance measurements are obtained using an electrode array selected from the group consisting of pole-pole, pole-dipole, dipole-pole, and dipole-dipole.

4. The method of claim 3, wherein the electrode array is located in both cased and non-cased boreholes and at a depth of up to about 50 m.

5. The method of claim 1, wherein obtaining electrical resistance measurements inside the electrically conductive casing is carried out by placing one or more electrodes adjacent an interior surface of the conductive casing.

6. The method of claim 1, wherein obtaining electrical resistance measurements inside the electrically conductive casing is carried out by locating an array of electrodes at spaced intervals along a length of conductive casing.

7. The method of claim 1, wherein the tomographic inversion of electrical resistance measurements is carried out using a finite element algorithm.

8. The method of claim 1, wherein the tomographic inversion of electrical resistance measurements is carried out using a code which calculates the electric potential response in an axial symmetric medium.

9. The method of claim 1, wherein obtaining the electrical resistance measurement is carried out using the same electrode position for potential measurements and current injection along the borehole axis.

10. A method involving tomographic inversion of electrical resistance measurements made within a steel casing in a borehole for the purpose of imaging the electrical resistivity distribution in a formation remote from the borehole, carried out by;
    making electrical resistance measurements inside a steel casing and from them inferring the electrical resistivity in the formation adjacent to the borehole; and
    tomographic inversion of electrical resistance measurements made from a borehole not cased with an electrically conducting casing, to infer the electrical resistivity distribution remotely from a borehole.

11. The tomographic inversion method of claim 10, using the same electrode position for potential measurements and current injection along the borehole axis.

12. The tomographic inversion method of claim 10, wherein the imaging of electrical resistance measurements is carried out using an array of electrodes selected from the group of pole-pole, pole-dipole, dipole-pole, and dipole-dipole configurations.

13. The tomographic inversion method of claim 10, wherein the tomographic inversion of electrical resistance measurement utilizes a finite element algorithm, and a code which calculates the electric potential response in an axial symmetric medium.

14. The tomographic inversion method of claim 10, wherein an array of electrodes are utilizing which are located in the foundation at a depth of up to about 50 below the foundation surface.

15. A method for electrical resistance tomography utilizing the effects of small currents flowing in the formation, which are sensed from very accurate measurements made inside a conductive casing, and thereafter using an inversion technique for producing tomographic measurements from these measurements.

16. The method of claim 15, wherein obtaining electrical resistivity measurements are carried out by utilizing an electrode, an electrode array selected from the group consisting of pole-pole, pole-dipole, dipole-pole, and dipole-dipole configurations.

* * * * *